US006823523B1

US006823523B1

(12) United States Patent
Campbell et al.

(10) Patent No.: US 6,823,523 B1
(45) Date of Patent: Nov. 23, 2004

(54) PROCESS AND SYSTEM FOR BLOCKING UNNECESSARY CALLBACKS TO EMPTY PAINT METHODS OF GRAPHICAL USER INTERFACE COMPONENTS

(75) Inventors: William Allan Campbell, Dorset (GB); Wai Yee Peter Wong, Austin, TX (US)

(73) Assignee: International Business Machines Corporations, Armonk, NY (US)

( * ) Notice: Subject to any disclaimer, the term of this patent is extended or adjusted under 35 U.S.C. 154(b) by 0 days.

(21) Appl. No.: 09/364,016

(22) Filed: Jul. 29, 1999

(51) Int. Cl.[7] .............................................. G06F 9/54
(52) U.S. Cl. .................... 719/318; 345/619; 345/788
(58) Field of Search ................................. 719/318, 310, 719/315; 345/619, 788–815; 709/315, 316, 310, 318

(56) References Cited

U.S. PATENT DOCUMENTS

| 5,012,510 | A |   | 4/1991  | Schaubs et al. ............... 379/92  |
| 5,155,761 | A |   | 10/1992 | Hammond .................... 379/67  |
| 5,247,676 | A |   | 9/1993  | Ozur et al. ................... 395/650 |
| 5,440,687 | A |   | 8/1995  | Coleman et al. ............. 395/200 |
| 5,642,509 | A | * | 6/1997  | Ohshima et al. ............. 709/318 |
| 5,768,510 | A |   | 6/1998  | Gish ........................... 395/200 |
| 5,805,775 | A |   | 9/1998  | Eberman et al. .............. 395/12  |
| 5,805,886 | A |   | 9/1998  | Skarbo et al. ............... 395/685 |
| 5,848,246 | A |   | 12/1998 | Gish ........................... 395/200 |
| 5,933,144 | A | * | 8/1999  | Alcorn ........................ 345/809 |
| 6,182,156 | B1 | * | 1/2001 | Togawa ....................... 709/316 |
| 6,281,893 | B1 | * | 8/2001 | Goldstein .................... 345/733 |

FOREIGN PATENT DOCUMENTS

| JP | 10051566 | 2/1998 |
| JP | 10065820 | 3/1998 |
| JP | 10084340 | 3/1998 |

OTHER PUBLICATIONS

Hughes, James. "Package". Jun. 7, 1997.*
Eng, Eirik. "Qt GUI Toolkit: Porting graphics to multiple platforms using a GUI toolkit." ACM, Nov. 1996.*
"Handling Input Events". http://www.genlogic.com/doc_html/glgpr.4.html.*
Koshizuka, Noboru et al. "Window Real–Objects: A Distributed Shared Memory for Distributed Implementation of GUI Applications." ACM, Nov. 1993.*
"Design Patterns in Java AWT." http://www.soberit.hut.fi/tik–76.278/group6/awtpat.html.*
Sun Microsystems. "Swing Short Course, Part II." 1997.*

(List continued on next page.)

*Primary Examiner*—Lewis A. Bullock, Jr.
(74) *Attorney, Agent, or Firm*—Duke W. Yee; Jeffrey S. LaBaw; Wayne P. Bailey

(57) ABSTRACT

A process and system for blocking unnecessary callbacks to empty paint methods of graphical user interface components is provided. The process initializes a platform-dependent peer class corresponding to a platform-independent class for the graphical user interface component and stores a value representing whether the platform-independent class extends a standard platform-independent class for the graphical user interface component. A platform-dependent paint method determines whether a callback to a paint method is necessary for processing of the paint event. The callback determination is performed by checking the stored value representing the extension of the standard graphics class for the component. If a callback is necessary, then the native paint method initiates a callback to the paint method of the platform-dependent peer object. The native paint method may be implemented in the C++ programming language, and the platform-dependent peer class and the platform-independent class may be implemented in the Java programming language.

9 Claims, 5 Drawing Sheets

OTHER PUBLICATIONS

International Business Machines Corporation; Client Object Model For DIstributed Servers; IBM Technical Disclosure Bulletin; vol. 39, No. 07, Jul. 1996; pp. 229–230.

International Business Machines Corporation; Method For Deadlock Prevention for Callbacks In A Distributed Environment; IBM Technical Disclosure Bulletin; vol. 38, No. 12, Dec. 1995; pp. 67–70.

International Business Machines Corporation; Use of Calback Routines In The Implementation Of Open Systems Interconnection Management Standards; IBM Technical Disclosure Bulletin; vol. 39, No. 01, Jan. 1996; pp. 367–373.

International Business Machines Corporation; Method for Agent Construction, Research Disclosure, Jun. 1998; pp. 767–768.

Czajkowski et al.; Jres: A resource accounting Interface for Java; 1998; pp. 21–35.

Seshadri; How Do I Implement Callbacks With Java's RMI?; 1998; pp. 123–124.

Xinda et al; Experiments on Heterogeneous Scheduling Via Callback; 1997; pp. 278–283.

Robinson; A C++ Class Library For Teaching and Research In Image Processing; 1996; p. 206–212.

* cited by examiner

```
Class LabelPeer extends ComponentPeer {
       /* New constant and variable */
802 ~~ static final String className_Label="java.awt.label";
804 ~~ boolean IsLabelObject;
       ...
806 ~~ LabelPeer(Label target) {
             super(target);

/* Determine whether target class (class corresponding to peer class)
                is an instance of Label class */
       808 ~~ if (target.getClass().getName().equals(className_Label))
                    IsLabelObject=true;
              else
                    IsLabelObject=false;
       }
       ...
}
```

FIG. 8A

```
Label::Paint(HDC)
{

/* Other graphic operations */
       ...
       /* If object is an instance of Label, there is no need for a callback
          since the paint() method of Label is empty */
810 ~~ if (!unhand(self)->IsLabelObject)
          812 ~~ DoCallback("handlePaint", "(IIII)V", r.left, r.top, r.right-r.left, r.bottom-r.top);
       ...

/* Other graphic operations */
}
```

FIG. 8B

PROCESS AND SYSTEM FOR BLOCKING UNNECESSARY CALLBACKS TO EMPTY PAINT METHODS OF GRAPHICAL USER INTERFACE COMPONENTS

TECHNICAL FIELD

The present invention relates generally to an improved data processing system and, in particular, to a process and system for improving execution performance in a runtime environment.

DESCRIPTION OF RELATED ART

With the "write once, run anywhere" concept, it is envisioned that applications or applets should be able to run on a mainframe computer and, without modification, also run on a hand-held device or Personal Digital Assistant (PDA). Obviously, a PDA and a mainframe computer have widely varying computing resources. An application running on these platforms may have widely varying amounts of memory or computing power at its disposal, and a properly designed application should take advantage of the available resources while maintaining its portability. On the other hand, since an application may execute in an environment with limited computing resources, a properly designed application should also attempt to save computing resources whenever possible while, again, maintaining its portability.

Many computer programs employ some type of graphical user interface (GUI) to provide output and receive input from a user. GUI routines are generally computationally expensive, and a program that makes a large number of calls to GUI routines may spend a significant amount of its execution time within these routines. Judicious use of calls to GUI routines is a standard programming practice for ensuring that computational resources are not wasted while an application is executing. However, an application must invoke the GUI routines in order to provide user interaction.

Many programming environments support a set of standard GUI components, such as buttons, checkboxes, text, labels, etc. In object-oriented programming environments, GUI components are often related in an inheritance hierarchy, e.g., the button class and the label class inherit from a generic component class. The class for a component inherits variables and methods from its superclass, including the paint method. The paint method is used to display the component and is called in response to an update or repaint request. For example, when a label that was previously covered by a window is uncovered when a user moves the window, any component that has been uncovered must redraw its contents, and this redrawing action is done in response to an update request or repaint request. In fact, any subclasses of the standard component classes are free to define their own paint methods (by overriding the paint method of the superclass) in order to provide additional graphics or a different look to the component. The paint methods of the subclasses are then called instead in response to an update or repaint request. Since components are used extensively in applications, their paint methods are called frequently, and a significant amount of execution time is spent within these routines.

Therefore, it would be advantageous to improve the performance of calls to GUI routines. It would be further advantageous to provide a process by which the handling of a paint event for a graphical user interface component may be optimized, thereby saving computing resources, and it would be particularly advantageous to provide an optimized process that is portable among computing platforms.

SUMMARY OF THE INVENTION

The present invention provides a process and system for blocking unnecessary callbacks to empty paint methods of graphical user interface components. The process initializes a platform-dependent peer class corresponding to a platform-independent class for the graphical user interface component and stores a value representing whether the platform-independent class extends a standard platform-independent class for the graphical user interface component. A native paint method determines whether a callback to a paint method of the platform-dependent peer object is necessary for processing of the paint event. The callback determination is performed by checking the stored value representing the extension of the standard graphics class for the component. If a callback is necessary, then the native paint method initiates a callback to the paint method of the platform-dependent peer object. The native paint method may be implemented in the C++ programming language, and the platform-dependent peer class and the platform-independent class may be implemented in the Java programming language.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 8A–8B depict sets of source code statements that implement the callback prevention of the present invention.

DETAILED DESCRIPTION OF THE PREFERRED EMBODIMENT

Figure 1:
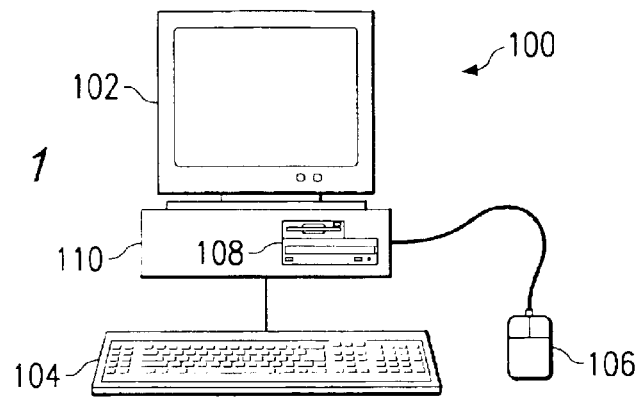
FIG. 1 is a pictorial representation depicting a data processing system in which the present invention may be implemented in accordance with a preferred embodiment of the present invention.

With reference now to FIG. 1, a pictorial representation depicts a data processing system in which the present invention may be implemented in accordance with a preferred embodiment of the present invention. A personal computer 100 is depicted, which includes a system unit 110, a video display terminal 102, a keyboard 104, storage devices 108, which may include floppy drives and other types of permanent and removable storage media, and mouse 106. Additional input devices may be included with personal computer 100. Personal computer 100 can be implemented using any suitable computer, such as an IBM Aptiva™ computer, a product of International Business Machines Corporation, located in Armonk, N.Y. Although the depicted representation shows a personal computer, other embodiments of the present invention may be implemented in other types of data processing systems, such as network computers, Web based television set top boxes, Internet appliances, etc. Computer 100 also preferably includes a graphical user interface that may be implemented by means of system software residing in computer readable media in operation within computer 100.

Figure 2:
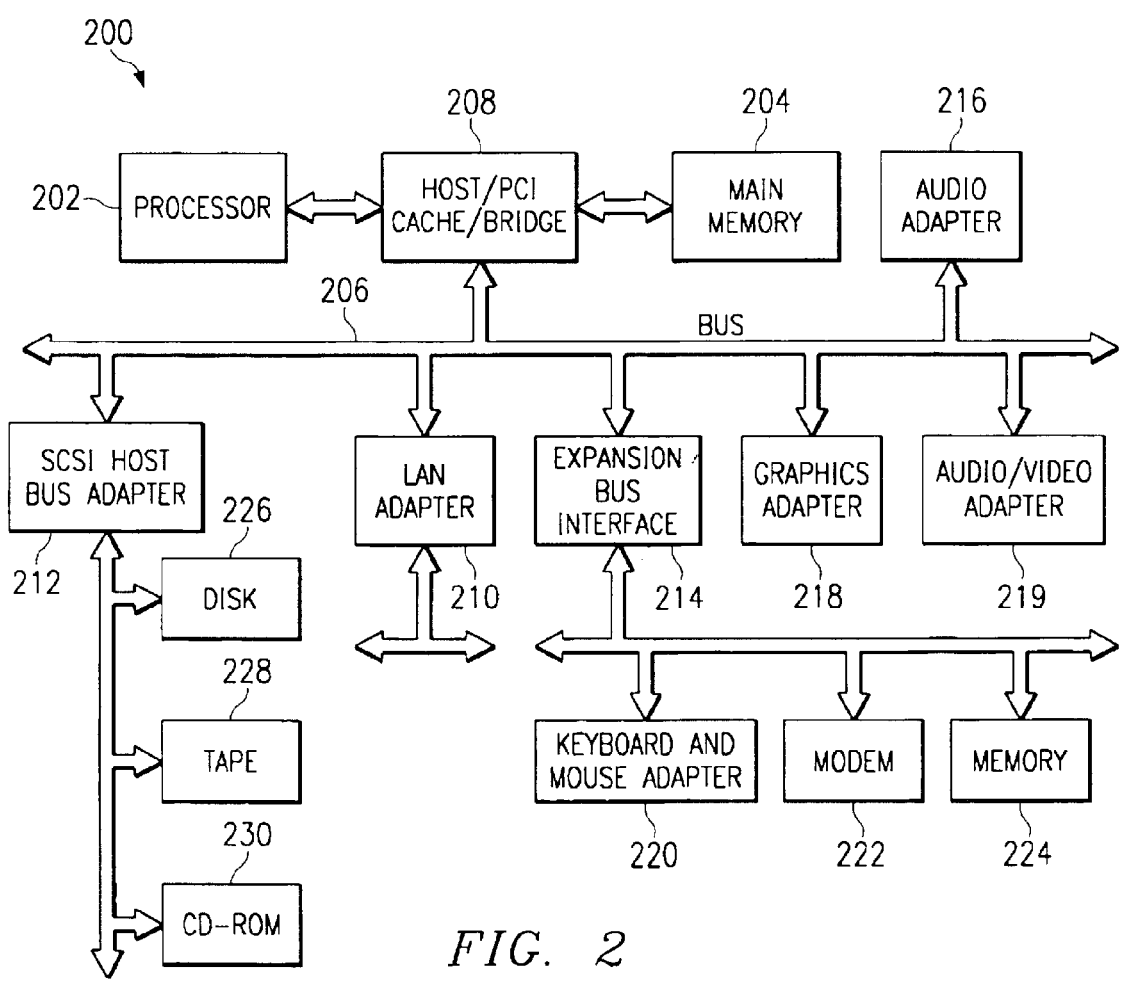
FIG. 2 is a block diagram illustrating internal components of a data processing system that may implement the present invention.

With reference now to FIG. 2, a block diagram illustrates internal components of a data processing system that may implement the present invention. Data processing system 200 is an example of a personal computer, such as computer 100 in FIG. 1. Data processing system 200 employs a peripheral component interconnect (PCI) local bus architecture. Although the depicted example employs a PCI bus, other bus architectures, such as Micro Channel and ISA, may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 200. "Java" is a trademark of Sun Microsystems, Inc. Instructions for the operating system and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a Personal Digital Assistant (PDA) device which is configured with ROM and/or flash ROM in order to provide nonvolatile memory for storing operating system files and/or user-generated data.

Other examples for data processing system 200 include an Internet information appliance for surfing the Internet and the World Wide Web. Internet information appliances may include Web-based interactive television set-top boxes. The depicted example in FIG. 2 and above-described examples are not meant to imply architectural limitations.

Figure 3:
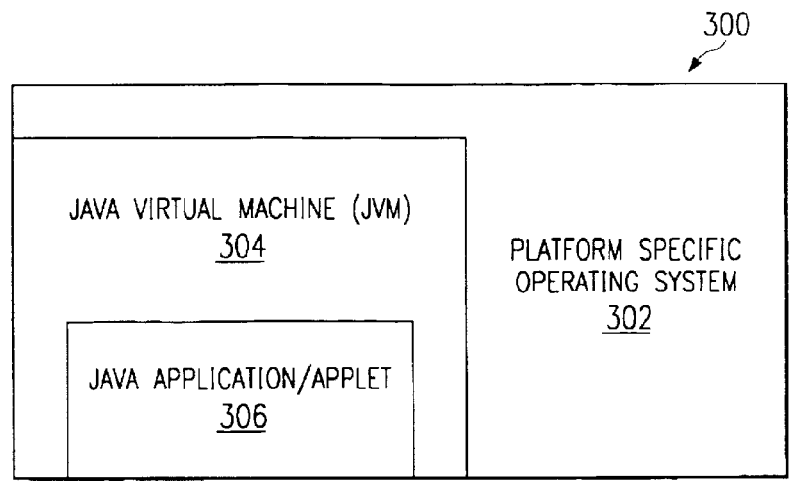
FIG. 3 is a block diagram illustrating the relationship of software components operating within a computer system that may implement the present invention.

With reference now to FIG. 3, a block diagram illustrates the relationship of software components operating within a computer system that may implement the present invention. System 300 contains platform-specific operating system 302 that provides hardware and system support to software executing on a specific hardware platform. Java Virtual Machine (JVM) 304 is a software platform on which a Java application can run. As an example of a typical configuration, the Microsoft Windows™ operating system provides support and services to a JVM that runs on top of the Windows™ operating system. In that case, the JVM consists of a set of dynamic link libraries (DLLs) and classes. JVM 304 provides a run-time environment with the ability to execute Java application or applet 306, which is a program, servlet, or software component written in the Java programming language. The computer system in which JVM 304 operates may be similar to data processing system 200 or computer 100 described above. However, JVM 304 may be implemented in dedicated hardware on a so-called Java chip, Java-on-silicon, or Java processor with an embedded picoJava core. The present invention provides a process and system for optimizing performance of an application or runtime environment making a call to a paint method of a GUI component. Although the present invention is described herein by using examples of Java components, it is contemplated that the present invention is operable within any object-oriented programming environment. However, because the Java environment provides a rich set of GUI components and many of their paint methods are actually empty, the Java environment provides a good example of the gains to be achieved by the optimization provided by the present invention.

Hence, the present invention may operate in conjunction with a JVM. In order to properly present the present invention, portions of the operation of a JVM according to Java specifications are herein described.

At the center of a Java runtime environment is the JVM, which supports all aspects of Java's environment, including its architecture, security features, mobility across networks, and platform independence.

The JVM is a virtual computer, i.e. a computer that is specified abstractly. The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAS.

A JVM must load class files and execute the bytecodes within them. The JVM contains a class loader, which loads class files from an application and the class files from the Java application programming interfaces (APIs) which are needed by the application. The execution engine that executes the bytecodes may vary across platforms and implementations.

The earliest implementations of JVMs made use of an interpreter to interpret bytecodes. To improve the runtime performance, a techique called the just-in-time compilation was developed. With this technique, the bytecodes of a method are compiled to native machine code, which is then cached and reused upon the future invocation of the method. The execution engine may also be implemented in hardware and embedded on a chip.

When an application is executed on a JVM that is implemented in software on a platform-specific operating system, a Java application may interact with the host operating system by invoking native methods. A run-time environment may have two kinds of methods: Java and native. A Java method is written in the Java language, compiled to bytecodes, and stored in class files. A native method is usually written in C/C++, assembly language, or some other language and compiled to the native machine code of a particular processor. Native methods are stored in a dynamically linked library whose exact form is platform-specific.

Figure 4:
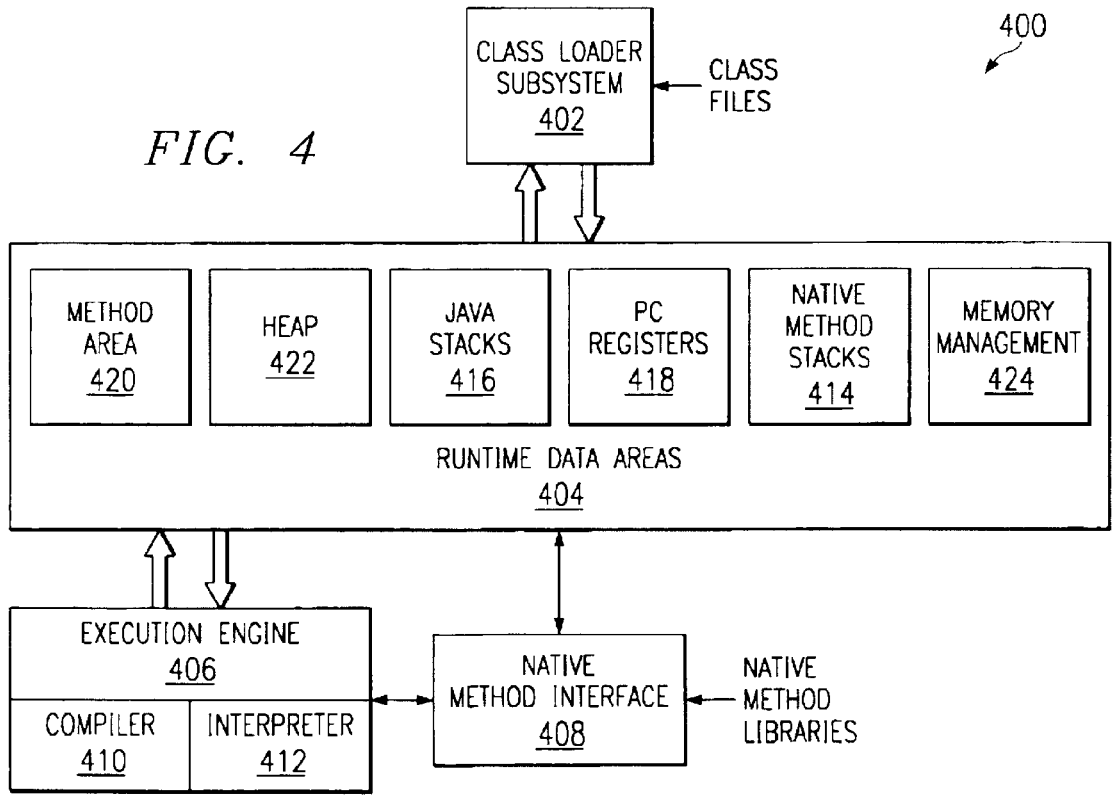
FIG. 4 is a block diagram depicting a Java virtual machine in accordance with a preferred embodiment of the present invention.

With reference now to FIG. 4, a block diagram of a Java virtual machine is depicted in accordance with a preferred embodiment of the present invention. JVM 400 includes a class loader subsystem 402, which is a mechanism for loading types, such as classes and interfaces, given fully qualified names. JVM 400 also contains runtime data areas 404, execution engine 406, native method interface 408, and memory management 424. Execution engine 406 is a mechanism for executing instructions contained in the methods of classes loaded by class loader subsystem 402. Execution engine 406 may be, for example, Java interpreter 412 or just-in-time compiler 410. Native method interface 408 allows access to resources in the underlying operating system. Native method interface 408 may be, for example, a Java native interface.

Runtime data areas 404 contain native method stacks 414, Java stacks 416, PC registers 418, method area 420, and heap 422. These different data areas represent the organization of memory needed by JVM 400 to execute a program.

Java stacks 416 are used to store the state of Java method invocations. When a new thread is launched, the JVM creates a new Java stack for the thread. The JVM performs only two operations directly on Java stacks: it pushes and pops frames. A thread's Java stack stores the state of Java method invocations for the thread. The state of a Java method invocation includes its local variables, the parameters with which it was invoked, its return value, if any, and intermediate calculations. Java stacks are composed of stack frames. A stack frame contains the state of a single Java method invocation. When a thread invokes a method, the JVM pushes a new frame onto the Java stack of the thread. When the method completes, the JVM pops the frame for that method and discards it. A JVM does not have any registers for holding intermediate values; any Java instruction that requires or produces an intermediate value uses the stack for holding the intermediate values. In this manner, the Java instruction set is well-defined for a variety of platform architectures.

PC registers 41B are used to indicate the next instruction to be executed. Each instantiated thread gets its own pc register (program counter) and Java stack. If the thread is executing a JVM method, the value of the pc register indicates the next instruction to execute. If the thread is executing a native method, then the contents of the pc register are undefined.

Native method stacks 414 store the state of invocations of native methods. The state of native method invocations is stored in an implementation-dependent way in native method stacks, registers, or other implementation-dependent memory areas. In some JVM implementations, native method stacks 414 and Java stacks 416 are combined.

Method area 420 contains class data while heap 422 contains all instantiated objects. The JVM specification strictly defines data types and operations. Most JVM implementations choose to have one method area and one heap, each of which are shared by all threads running inside the JVM. When the JVM loads a class file, it parses information about a type from the binary data contained in the class file. It places this type information into the method area. Each time a class instance or array is created, the memory for the new object is allocated from heap 422. JVM 400 includes an instruction that allocates memory space within the memory for heap 422 but includes no instruction for freeing that space within the memory. Memory management 424 in the depicted example manages memory space within the memory allocated to heap 420. Memory management 424 may include a garbage collector which automatically reclaims memory used by objects that are no longer referenced by an application. Additionally, a garbage collector also may move objects to reduce heap fragmentation.

As noted previously, the present invention provides a process and system for blocking unnecessary callbacks to empty paint methods of GUI components. Because the Java environment provides a rich set of components and many of their paint methods are actually empty, there is a large overhead cost associated with unnecessary callbacks to empty paint methods. This overhead is generated by the complexity necessary to achieve platform independence, as described in more detail below.

Java supports a set of standard GUI components, such as Button, CheckBox, TextComponent, Label, etc. All of these components inherit variables and methods from the Component class, including the paint method. The paint method is used to display the component and is called in response to an update or repaint request. For example, when a label that was previously covered by a window is uncovered when a user moves the window, any component that has been uncovered must redraw its contents, and this redrawing action is done in response to an update request or repaint request.

Components are used extensively in applications, so their paint methods are called frequently. In fact, any subclass of the Component class is free to define its own paint method in order to provide additional graphics or a to provide a different appearance for the component. The paint methods of the subclasses are then called instead in response to an update or repaint request. However, given the infrastructure of the Java runtime environment, standard GUI components infrequently override the paint method of the general Component class.

Figures 5A, 5B:
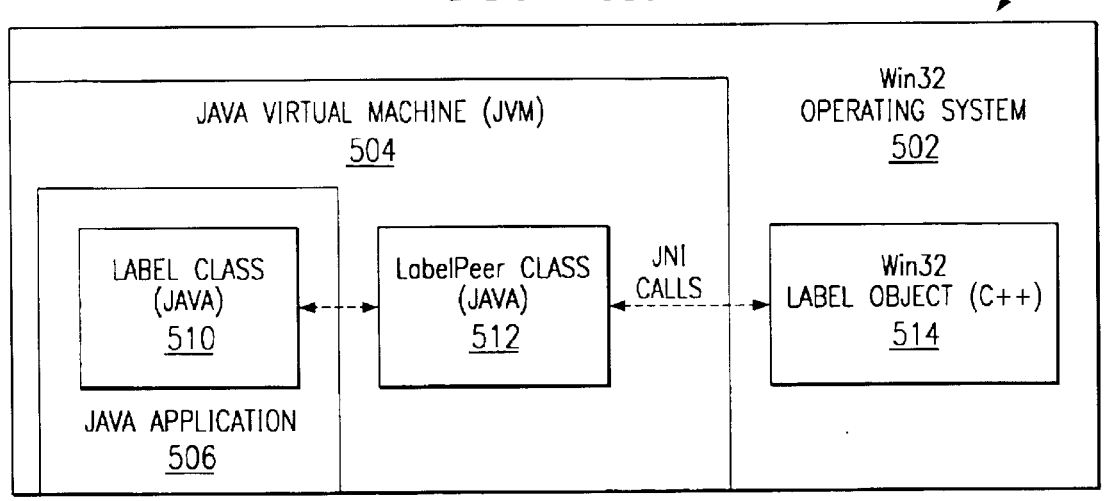
FIGS. 5A–5B are block diagrams depicting the infrastructure of the Java runtime environment through which Java components are displayed while providing platform independence to Java applications.

With reference now to FIGS. 5A–5B, block diagrams depict the infrastructure of the Java runtime environment if; through which Java components are supported in a manner providing platform independence to Java applications. The Label class of the Java Abstract Windowing Toolkit. (AWT) is used as an example to show the manner in which the AWT component architecture may be deployed on a computer platform that uses the Microsoft Windows™ 32-bit operating system. The AWT provides an application programming interface (API) for common user interface components, such as buttons, labels, menus, etc.

FIG. 5A shows system 500 in a manner similar to system 300 shown in FIG. 3. System 500 contains Microsoft Win32 operating system 502 that provides hardware and system support to software executing on a specific hardware platform. JVM 504 provides a run-time environment with the ability to execute Java application 506.

For each AWT component class, there is a corresponding class, called a peer class, that is responsible for interacting with the underlying native graphics subsystem. In order to implement a Label component, Label class 510 interacts with LabelPeer class 512, which interacts with Win32 Label object 514.

FIG. 5B shows some of the same objects from FIG. 5A. However, FIG. 5B depicts the manner in which Label class 510 may be considered platform-independent while LabelPeer class 512, Win32 Label object 514, and native graphics subsystem 516 may be considered platform-dependent.

In the example shown in FIG. 5A, Label class 510 gets access to LabelPeer class 512 through the Toolkit class, and LabelPeer class 512 makes extensive use of native methods, which in this example are shown as having been implemented in the C++ programming language. When the Label object is created or instantiated, the LabelPeer object is correspondingly created. The LabelPeer object in turn causes the creation of the Win32 Label object which interacts directly with the underlying Windows graphics subsystem.

There are two event queues within the infrastructure shown in FIGS. 5A–5B which are pertinent to the implementation of a component. Underlying the Java classes is a Java event queue that stores Java events, e.g., paint events, text events, focus events, etc. Underlying the Win32 native graphics subsystem is a message queue for a native window that is implementing the Win32 Label component, and the message queue stores system messages and window messages, e.g., WM_PAINT, WM_MOVE, and WM_SIZE. The Java event queue and the Windows message queue are managed by two different threads.

As noted previously, there is a large overhead cost associated with the complexity of the Java runtime environment, especially between method invocations that must bridge the division between the platform-independent, pure Java objects and the platform-dependent, native method objects. When the label object is exposed, such as during the movement of a window that previously obscured the label object, the native graphics subsystem sends a WM_PAINT message through the message queue to the Win32 Label object. The window procedure for the Win32 Label object processes the WM_PAINT message, during which the graphic space or bitmap for the object is updated, painted, or repainted, as necessary. After the painting is completed at the native level, the Win32 Label object ensures that a callback is made to the LabelPeer object by posting a paint event into the Java event queue in order to provide the LabelPeer object the opportunity to perform any required painting actions within the component. In response to the posting of the paint event, the paint method of LabelPeer will execute.

This entire sequence for a callback from the C++ code to the Java code is computationally expensive. In response to making a native method interface (NMI) or JNI call, the following sequence of actions may occur: a paint event object is created by allocating space from memory; the paint event is placed into the event queue; the paint event is dispatched to the target component; the target component executes its paint method in response to a receipt of the paint event; the memory for the paint event object is eventually deallocated by a garbage collector; each invocation of a method along the process requires stack frames to be allocated, etc. As can be seen, each stage in this chain of processing requires the execution of a relatively large number of instructions simply to provide the necessary administrative support for obtaining an updated display of the graphical component.

Moreover, based upon the design of the AWT, classes like Label have their repaint operations completely accomplished at the native level. Hence, the painting of these components does not rely on the paint methods of the peer classes, and in fact, their paint methods are actually empty. However, if a programmer desires to display a special label, he can freely choose to subclass Label and override the empty paint method by implementing a paint method. In that situation, the paint method would not be empty.

As noted previously, the present invention provides a process and system for ensuring that computational resources are not expended for costly calls to empty paint methods. By blocking unnecessary callbacks to empty paint methods of GUI components, the paint event and its associated processing are avoided, thereby enhancing the performance of the application. The present invention is applicable to any AWT components whose paint methods are known to be empty.

Figure 6:
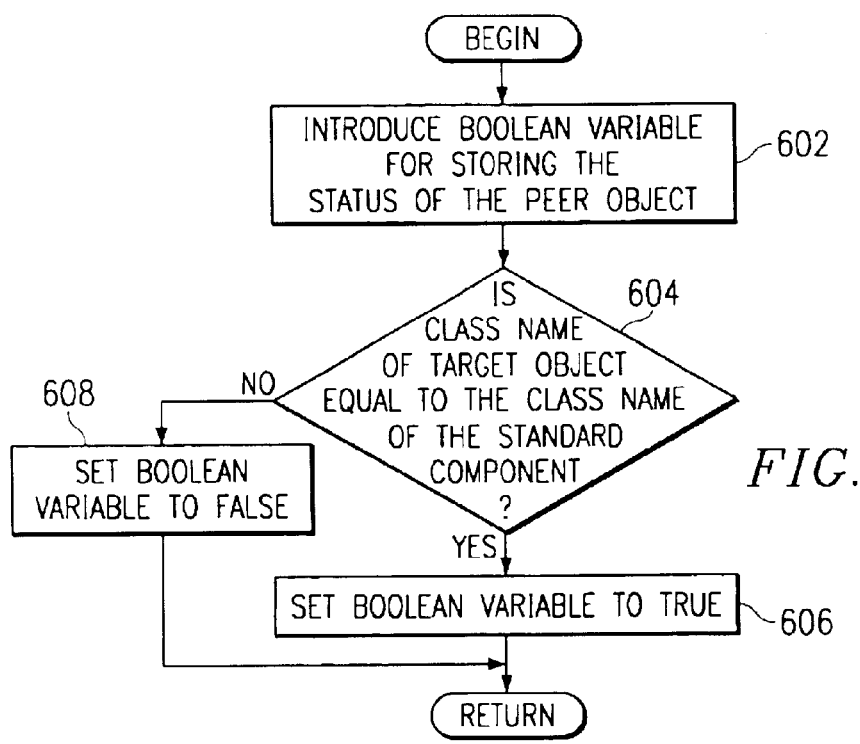
FIG. 6 is a flowchart depicting a process for creating a Java structure for preventing unnecessary callbacks to empty paint methods of components.

With reference now to FIG. 6, a flowchart depicts a process for creating a Java structure for preventing unnecessary callbacks to empty paint methods of components. The process begins by introducing a boolean variable for storing the status of the component within the peer class of the component at the time of object initialization (step 602). Alternatively, an integer, bit flag, or other data type may be used to signal the state of the paint method. Continuing with the examples using the Label class, a boolean variable named "IsLabelObject" may be introduced in the LabelPeer class.

A determination is then made as to whether the class name of the object being initialized is the same as a standard AWT class name (step 604). In the example, the class name of the object may be compared against "java.awt.XXXX", where "XXXX" is an AWT component; in this case, the comparison is made with "java.awt.Label", the AWT name for the standard Label component class.

If the names are equal, then the boolean variable is set equal to true (step 606). If the names are not equal, then the boolean variable is set equal to false (step 60B), after which the process terminates by continuing execution or returning to the appropriate calling location.

If the corresponding class name is not the same as the standard class name, then the corresponding class is not the same as the standard class, and the AWT can assume that the corresponding class has extended the standard class. In the example, the name of the class will be something other than "java.awt.Label", and the variable will be appropriately set to false so that native method may detect whether to perform a callback to the peer class.

At this point, if the variable is set to false, it is only known that the standard class has been extended. It is not known whether the subclass has a paint method which has been implemented or is empty. Therefore, in order to ensure that a paint method is called for all cases in which the paint method has been implemented, a callback is made in all cases in which the standard class has been extended.

Figure 7:
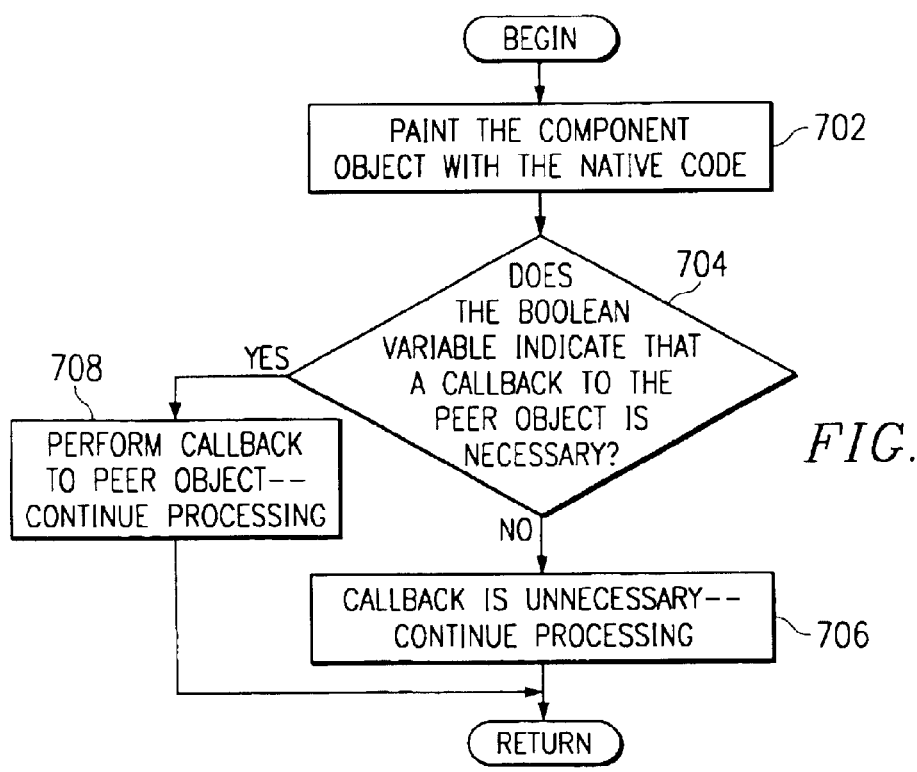
FIG. 7 is a flowchart depicting a process for checking whether a callback to a paint method is necessary.

FIG. 6 describes a process for setting up the necessary information for preventing unnecessary callbacks, whereas FIG. 7 describes a process of using the information to determine whether a callback is necessary.

With reference now to FIG. 7, a flowchart depicts a process for checking whether a callback to a paint method is necessary. The process begins by painting the component object with the native method (step 702). Continuing with the previous example, the Win32 Label object makes the appropriate calls to the native graphics subsystem of the Win32 operating system to paint the object. A determination is then made by the native code as to whether the boolean variable indicates that a callback is necessary (step 704). The boolean variable was initialized when the corresponding peer object was initialized. Continuing with the example from FIG. 6, "IsLabelObject" is checked for true or false.

If the boolean variable is true, then a callback is unnecessary as the object has not overridden the empty paint method (step 706). If the boolean variable is false, then a callback to the peer object is performed (step 708). In the example, the native code calls back to the LabelPeer object to create the paint event and post it into the Java event queue for eventual processing by a corresponding Label object. Whether or not a callback is performed, the process terminates by continuing execution or returning to the appropriate calling location.

With reference now to FIGS. 8A–8B, the figures depict sets of source code statements that implement the callback prevention of the present invention. FIG. 8A shows a set of Java language source code statements that initialize a boolean variable to indicate whether a callback to the peer class is necessary. Statement 802 is a static variable or constant that provides storage for the standard AWT class name. Statement 804 is a boolean variable for storing the state of the Label component, i.e. whether or not the class name of the target object corresponding to the standard AWT class. Statement 806 is the initialization routine for the LabelPeer class in the platform-dependent portion of the system. LabelPeer is invoked with a parameter containing the target class in the platform-independent portion of the system, i.e. the class corresponding to the peer class. Statement 808 provides a true/false determination of whether the target class is the standard AWT class. The outcome of the determination is stored in the boolean variable.

FIG. 8B shows a set of C++ language source code statements that determine whether a callback to the peer class is necessary. FIG. 8B contains the method for handling paint messages for the Label component. As part of this method's processing, it determines whether a callback to the peer class is necessary. Statement 810 dereferences a handle to an object that contains the boolean variable in which the status of the target class was previously stored, and the statement determines whether a callback should be performed. Statement 812 shows the actual callback to the peer class if statement 810 determines that it is proper to do so.

Although C++ has been used for an example of the native code, other languages may be used to implement the platform-dependent portion of the present invention.

With the process of the present invention, unnecessary callbacks to the LabelPeer object for repainting the Label object are prevented, which saves computational resources. For a subclass of Label whose class name is not "java.awt.Label", a callback is made since the AWT has no knowledge about its paint method. The present invention may be applied to a variety of objects that require painting.

It is important to note that while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media such as floppy disks, a hard disk drive, RAM, CD-ROMs, and transmission-type media such as digital and analog communications links.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are

What is claimed is:

1. A process for optimizing handling of a paint event for a graphical user interface component in a data processing system, the process comprising the computer-implemented steps of:

determining whether a callback to a paint method is necessary for processing of the paint event, wherein the step for determining whether a callback to a paint method is necessary for processing of the paint event ascertains whether the platform-independent class extends a standard platform-independent class for the graphical user interface component; and initiating a callback to the paint method in response to a determination that the callback is necessary for processing of the paint event.

2. The process of claim 1 further comprising:

comparing a name for the platform-independent class with a name for the standard platform-independent class, wherein the names are equal if the standard platform-independent class has not been extended.

3. The process of claim 2 further comprising:

checking, from a platform-dependent paint method, a stored value representing whether the platform-independent class extends the standard platform-independent class.

4. A data processing system for optimizing handling of a paint event for a graphical user interface component, the data processing system comprising:

determining means for determining whether a callback to a paint method is necessary for processing of the paint event, wherein the determining means for determining whether a callback to a paint method is necessary for processing of the paint event ascertains whether the platform-independent class extends a standard platform-independent class for the graphical user interface component; and initiating means for initiating a callback to the paint method in response to a determination that the callback is necessary for processing of the paint event.

5. The data processing system of claim 4 further comprising:

comparing means for comparing a name for the platform-independent class with a name for the standard platform-independent class, wherein the names are equal if the standard platform-independent class has not been extended.

6. The data processing system of claim 5 further comprising:

checking means for checking, from a platform-dependent paint method, a stored value representing whether the platform-independent class extends the standard platform-independent class.

7. A computer program product in a computer readable medium for use in a data processing system for optimizing handling of a paint event for a graphical user interface component, the computer program product comprising:

first instructions for determining whether a callback to a paint method is necessary for processing of the paint event, wherein the first instructions for determining whether a callback to a paint method is necessary for processing of the paint event ascertains whether the platform-independent class extends a standard platform-independent class for the graphical user interface component; and second instructions for initiating a callback to the paint method in response to a determination that the callback is necessary for processing of the paint event.

8. The computer program product of claim 7 further comprising:

instruction for comparing a name for the platform-independent class with a name for the standard platform-independent class, wherein the names are equal if the standard platform-independent class has not been extended.

9. The computer program product of claim 8 further comprising:

instructions for checking, from a platform-dependent paint method, a stored value representing whether the platform-independent class extends the standard platform-independent class.

* * * * *

UNITED STATES PATENT AND TRADEMARK OFFICE
CERTIFICATE OF CORRECTION

PATENT NO. : 6,823,523 B1
DATED : November 23, 2004
INVENTOR(S) : Campbell et al.

It is certified that error appears in the above-identified patent and that said Letters Patent is hereby corrected as shown below:

Column 6,
Line 1, after "registers" delete "41B" and insert -- 418 --.

Column 12,
Line 9, before "for comparing" delete "instruction" and insert -- instructions --.

Signed and Sealed this

Twenty-seventh Day of December, 2005

JON W. DUDAS
*Director of the United States Patent and Trademark Office*